US 6,594,588 B1

(12) United States Patent
Peden et al.

(10) Patent No.: US 6,594,588 B1
(45) Date of Patent: Jul. 15, 2003

(54) APPARATUS AND METHOD FOR MONITORING AND CONTROLLING LABORATORY INFORMATION AND/OR INSTRUMENTS

(75) Inventors: Joseph Martin Peden, Sale (GB); Morgan Nicholas Skinner, Manchester (GB); Robin Dylan Jones, Timperley (GB); Andrew Martin Davis, Stoke-on-Trent (GB); Philip Ian Holt, Rochdale (GB); Graham Stuart Taylor, Altrincham (GB)

(73) Assignee: Thermo Bio Analysis Corp., Santa Fe, NM (US)

( * ) Notice: Subject to any disclaimer, the term of this patent is extended or adjusted under 35 U.S.C. 154(b) by 0 days.

(21) Appl. No.: 09/700,853

(22) PCT Filed: May 17, 1999

(86) PCT No.: PCT/GB99/01569

§ 371 (c)(1),
(2), (4) Date: May 7, 2001

(87) PCT Pub. No.: WO99/60372

PCT Pub. Date: Nov. 25, 1999

(30) Foreign Application Priority Data

May 18, 1998 (GB) .............................................. 9810574

(51) Int. Cl.[7] ................................................. G06F 3/14
(52) U.S. Cl. ..................... 702/32; 707/103 Z
(58) Field of Search ............................. 702/32, 19, 80, 702/182, 183, 104.1; 700/28–30, 266; 707/100–102, 103 R, 103 Y, 103 Z

(56) References Cited

FOREIGN PATENT DOCUMENTS

EP     0 295 760 A2     12/1988

OTHER PUBLICATIONS

R. F. Gordon, "End–User Object–Oriented Programming By Means of an Object–Oriented Interface", 8391 OOPS Messenger 5(1994), Jan., No. 1, N.Y. USA, pp. 6–12.

Neil Hunt, "IDF A graphical data flow programming language for image processing and computer vision", IEEE, 1990, XP 000215369, pp. 350–360.

*Primary Examiner*—Marc S. Hoff
*Assistant Examiner*—Edward Raymond
(74) *Attorney, Agent, or Firm*—Westman, Champlin & Kelly, P.A.

(57) ABSTRACT

A system and method for handling laboratory information includes a graphical user interface with a plurality of windows. A palette of icons is provided in a first one of the windows, each icon representing a predetermined task to be executed by a processor in communication with the graphical user interface. The processor is also in communication with a database containing static laboratory data (such as the type of sample to be analysed) as well as dynamic laboratory data (such as the name of the specific sample to be tested and the results of that test). A user can select icons from the first window and "drag and drop" them into a second window. A sequence of tasks may thus be built up, in the form of a tree structure, and when run the processor executes the sequence of tasks in turn by reference to the static and dynamic laboratory data.

25 Claims, 4 Drawing Sheets

APPARATUS AND METHOD FOR MONITORING AND CONTROLLING LABORATORY INFORMATION AND/OR INSTRUMENTS

This application is a 35 U.S.C. §371 filing of International Patent Application No. PCT/GB99/01569, filed May 17, 1999. This application claims priority benefit of Great Britain Patent Application No. 9810574.5, filed May 18, 1998.

FIELD OF THE INVENTION

This invention relates to the field of monitoring and controlling laboratory information and/or laboratory instruments.

BACKGROUND TO THE INVENTION

The word laboratory may be taken to encompass many different types of establishment, from a single room containing one or two scientific instruments to a building housing hundreds of scientists and pieces of equipment; from a place of academic research to the process control room of a brewery, food manufacturing plant, oil refinery, chemical or pharmaceutical facility etc. What most laboratories have in common is their function of performing scientific tests or experiments and their product, laboratory information. In a modern laboratory, there may be hundreds of samples, in respect of each of which hundreds of items of data must be known such as the sample's origin, its amount, its likely constituents, the chain of custody of the sample, any tests it has undergone (and their results) etc. There will also be information regarding any tests that the sample should undergo in the future and instructions as to the carrying out of these tests, amongst many other types of information and instructions.

The task of handling and managing these data and instructions for even a small laboratory can be vast, and for this purpose different types of Laboratory Information Management System (LIMS) have been proposed. LIMS are software-based systems using databases to store, retrieve, manipulate and report laboratory data, to provide information about work being and to be undertaken and/or to control laboratory instruments. The LIMS may provide spreadsheet, word processor, statistical and quality control functions in addition to other functions which may be specific to certain types of laboratory for example a commercial research laboratory may require an automatic billing function. The LIMS may also directly control a number of scientific instruments. Since the needs of each laboratory are different, a typical LIMS package may not fulfil all a laboratory's requirements "out of the box", but will require some customisation, either by the vendor or by the customer. Such customisation may require many weeks of expensive coding, with or without the aid of regulated business models, in order that the LIMS system can operate according to a particular laboratory's exact requirements. Should these requirements change at a future date, for example with the introduction of new statutory requirements, further expensive coding will be necessary. The amount of effort required to customise the base software can often be the major financial and time cost of a LIMS installation. The flow of events happening to a sample in a typical prior art LIMS is shown in FIG. 1. Before running any samples, the system is configured by defining various static data tables and entering data therein. This information will typically be about the laboratory environment, the types of analyses which can be performed, the test schedules and the types of samples to be analyzed. In FIG. 1 these steps are shown as boxes 1, 2, 3 and 4 respectively. Once this data is entered, samples may be run. A sample is logged in as shown in box 5 and a worksheet is generated (box 6) giving a list of tests to be carried out on the sample. This worksheet may for example be printed out on paper as a series of instructions for a human operator, as a bar code to be read by a bar code reader or automatically sent to an instrument or series of instruments for automatic handling of a sample. The results of these tests are then entered into the system (again either manually or automatically)—this is shown as box 7. The results may then be outputted in report form (box 8), and/or checked against nominal values to check the quality of the product from which the sample was drawn (box 9). Once the results have been authorised (box 10) the data can be archived.

In a typical LIMS the sequence of work is broadly fixed, although each individual step may be modified by the user. Changing the sequence of events, or adding further logical branches (e.g. IF . . . THEN . . . ELSE nodes) to the sequence usually requires the development of custom code, generally in the programming language of the LIMS, which may be a proprietary language unique to that LIMS. Such customisation is not only complex and expensive but it can lead to problems for the customer in terms of upgrading and validating their LIMS. For example, the business process of a particular laboratory may require that each time a sample arrives from a particular client, a receipt should be generated and sent to that client. In a traditional LIMS, the services of an experienced analyst would be required to design and code a custom mechanism for this scenario.

SUMMARY OF THE INVENTION

The object of the present invention is to provide a LIMS which obviates the need for such customisation. In particular, the object of the present invention is to provide a LIMS which allows the user readily to generate and modify the sequence of event to be undergone by a sample or samples. Another object of the present invention is to provide a LIMS which is easy to use and modify. A further object of the invention is to provide means for monitoring and/or controlling laboratory information and/or instrumentation which is easily configured and used by the user. These and other objects are realized by the invention as described below.

According to a first aspect of the present invention, there is provided a laboratory control system, which has an electronic storage device for storing static and dynamic laboratory data. The system also has a system data input/output which sends instructions to the laboratory and receives dynamic laboratory data back. A GUI and a user input allow a sequence of tasks to be defined which a processor executes in turn, using the static and the dynamic data, the latter of which is obtained from the laboratory.

There are a number of advantages to the system of the invention over the prior art. Firstly, the use of graphical symbols or 'objects' allows straightforward set up of a complex sequence of tasks (hereafter referred to as a 'workflow') without the need for a skilled programmer. Secondly, the overall amount of code that needs to be written is dramatically reduced with the present invention. Each symbol or 'object' requires a finite amount of code to be written to allow the task function to be fully specified, as well as to allow connection or linkage to other tasks.

For example, to define a suitable number of different sequences or workflows to address most eventualities in a laboratory information management system may require several tens of different symbols in the array of symbols, requiring several tens of thousands of lines of codes. However, to write separate bespoke programs to address the many different test procedures in a large laboratory (as frequently occurred in the prior art) may require several million lines of code.

The term 'static laboratory data' will be understood by those skilled in the art to refer to the body of information held by the laboratory, in a database for example, and which relates to procedures which tend not to change with time. By way of example only, static laboratory data may include the types of samples to be analysed and the types of analyses to be performed.

Likewise, the term 'dynamic laboratory data' will be understood by the skilled reader to refer to the body of information held by the laboratory, again in a database for example, and which usually relates to procedures specific to each particular experiment. For example, dynamic laboratory data may include the identification of a specific sample to be analysed, or the results of such analysis.

The invention also extends to a method of controlling data relating to, and obtained from, a laboratory. A computer program product embodied on a computer readable medium is also provided. Other features and advantages will become apparent from a review of the following detailed description.

BRIEF DESCRIPTION OF THE DRAWINGS

An example of the invention will now be described in greater detail with reference to the accompanying drawings, in which.

DETAILED DESCRIPTION OF A PREFERRED EMBODIMENT

The operation of the invention relies on the concept of the workflow. A workflow in this context is a model of the laboratory process which defines the events be carried out on a sample or samples. The workflow may include the steps of defining a sample and/or sample group, splitting off and defining aliquots of samples, specifying decisions to be taken, tests to be applied and reports to be printed. The user can build a macroscopic workflow using graphical tools which correspond to workflow nodes. In this way, often complex laboratory processes can be modelled using a structured task list made up of a series of workflow nodes selected by the user. The workflow can be structured to incorporate specific event nodes which allow status changes or report processing, for example, to be triggered as a response to the outcome of a particular test. In summary, a workflow defines the business rules for events to be carried out on a sample. As the structure of a workflow is hierarchical, it is necessary to define workflows for results, tests, aliquots and samples before a sample workflow can be used for sample login. Details about particular steps in the workflow may be specified in associated templates, which may be pre-defined or defined by the user himself.

Figure 1:
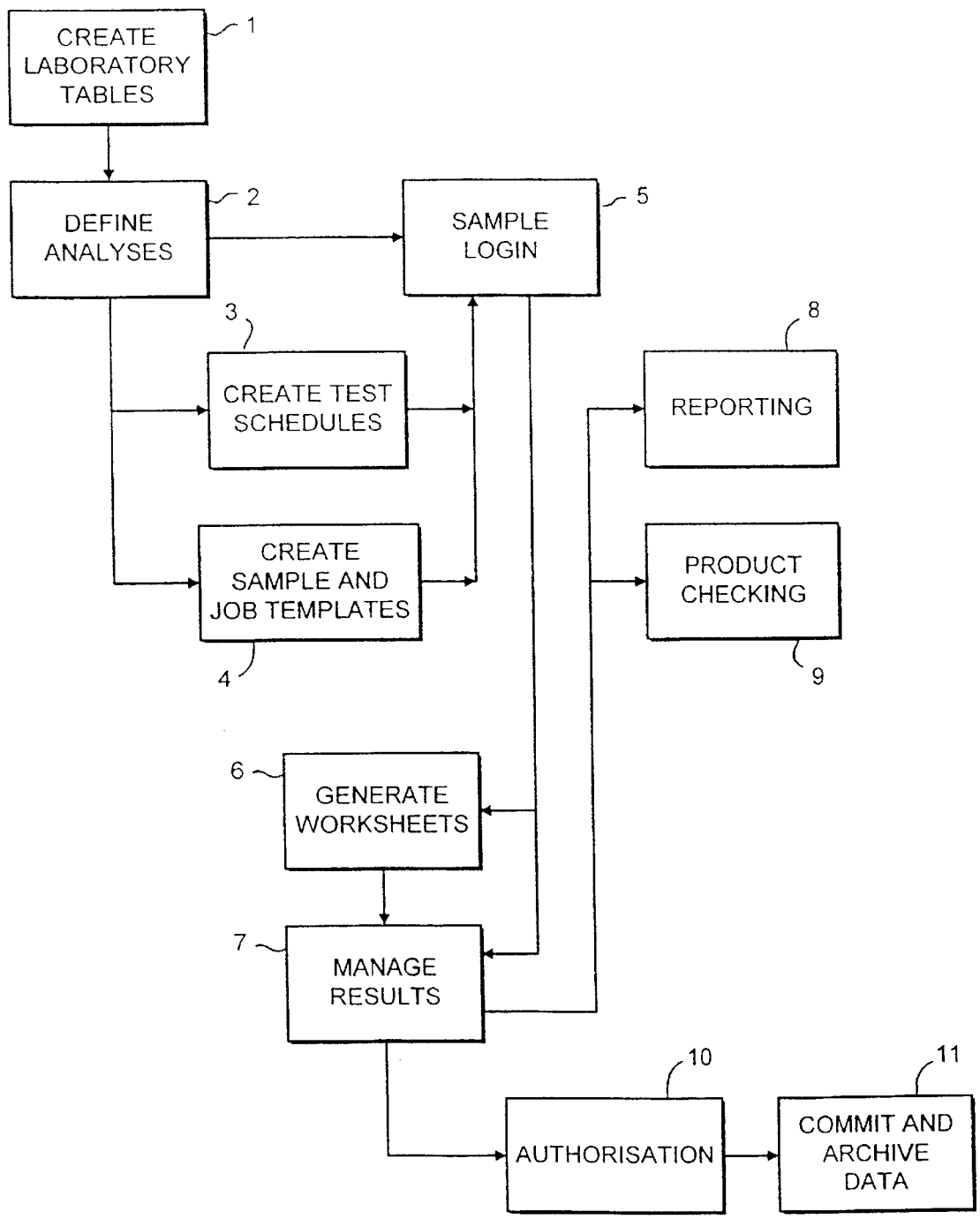
FIG. 1 shows the flow of events in a typical prior art LIMS.
Figure 2:
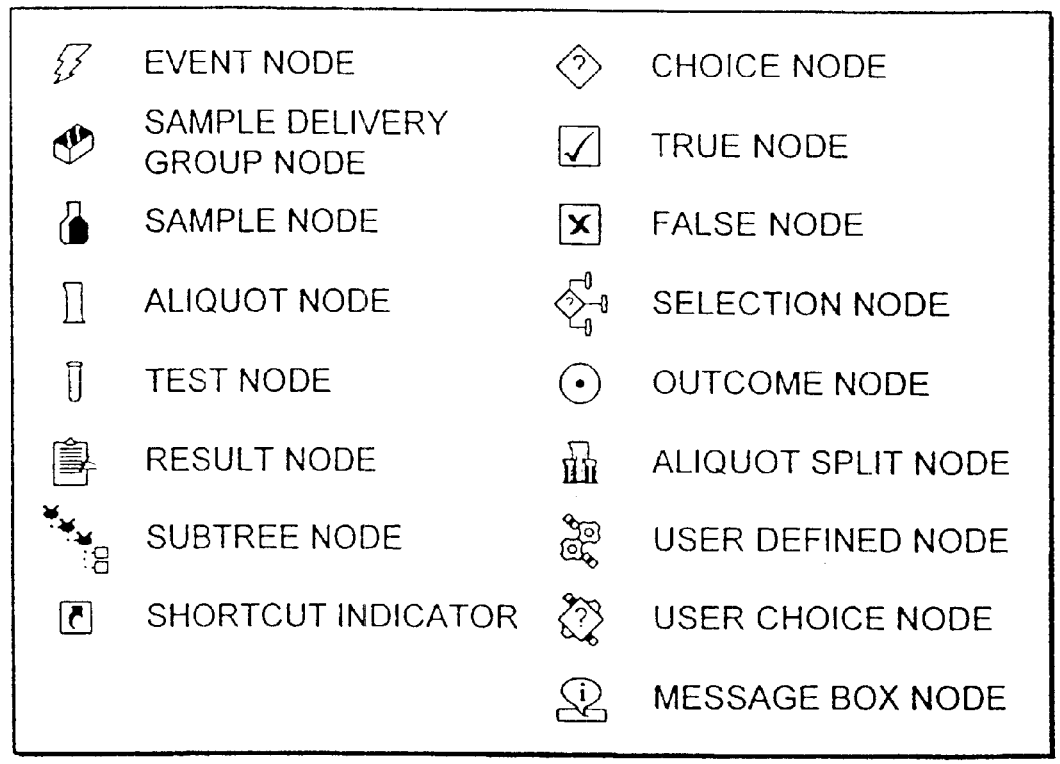
FIG. 2 shows examples of typical graphical symbols available to the user.
Figure 3:
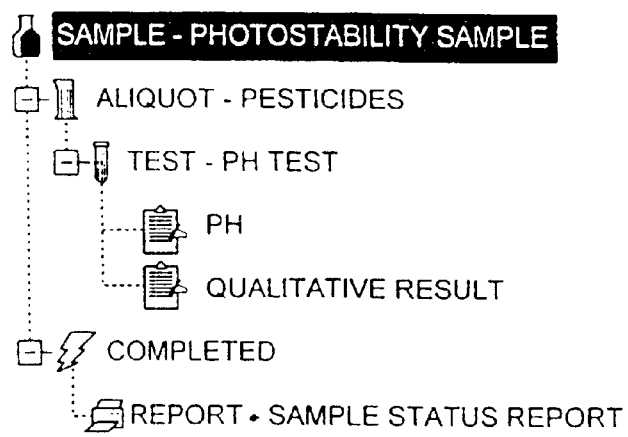
FIG. 3 shows an example of how the display would appear in a particular aspect of the current invention.

A workflow can therefore be used by the user to model internal business practices, obviating the need for custom coding. To show an example of one realisation of the invention, see FIG. 3 (the symbols used being detailed in FIG. 2), which shows how the screen would look when the user has set up the system to handle a sample with its corresponding aliquot, complete with a single test and a set of results. The report beneath the event node will run when the sample completes. Each symbol selected by the user corresponds to a type of workflow node, as shown in FIG. 2. Each type of workflow node has a series of corresponding workflow tables which define the properties of each node. There may be many predefined node types, some examples of which are shown in FIG. 2. As discussed, the workflow is a hierarchical structure, and the relevant table will define which node types may appear beneath the current node type. As an example, it is valid for ALIQUOT nodes to appear beneath SAMPLE nodes, however the converse is not true. The data within this table is queried within the workflow screen, when a user clicks on a node in the tree, so that the user will not be allowed to position a node in a position disallowed in the table.

Certain workflow nodes may support events, for example "Completed" or "Schedule Item". All events which may be associated with each node type may be stored in a table associated with each node. Events may be pre-defined or user-defined—for example if the user's business process requires an aliquot to be archived and a certain type of report to be printed each time the sample fails a particular quality control test, the user may define this as an event. A user event can be triggered by some part of the workflow or can be run manually by the user.

Figure 4:
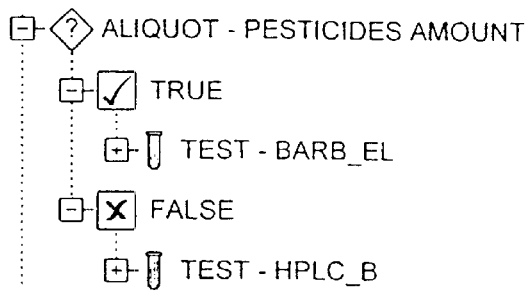
FIG. 4 shows an example of the use of a Choice node.
Figure 5:
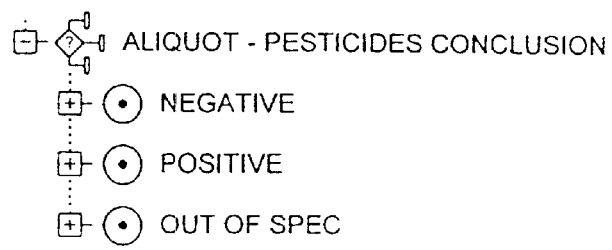
FIG. 5 shows an example of the use of a Selection node.
Figure 6:
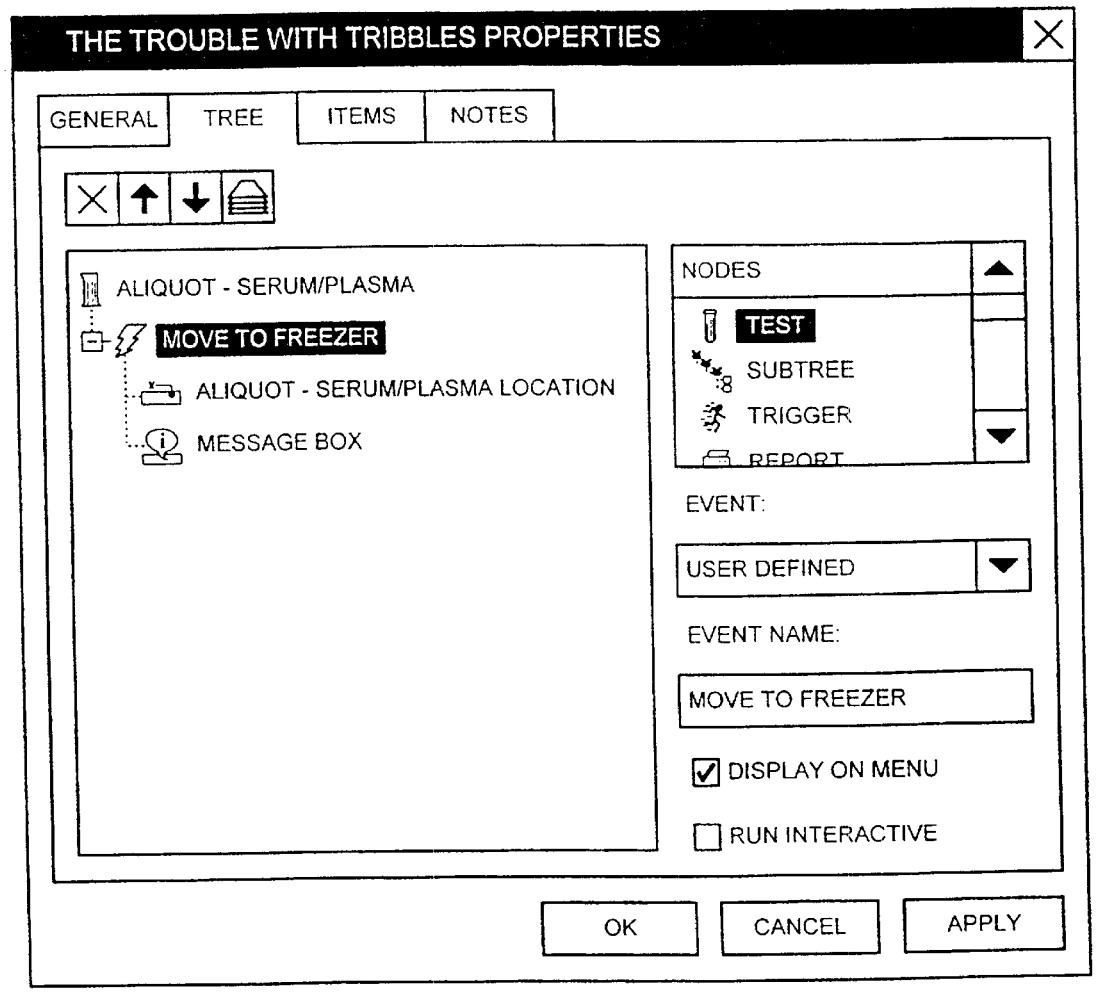
FIG. 6 shows an example of a User Defined Event.

When the workflow is processed, the system reads the relevant table, instantiates objects internally, and then processes those objects. For each workflow node processed, the system looks up the relevant table, and creates an object of the type specified within it. In the case of a sample node, for example, this forces a new sample to be logged into the system. The sample workflow node has a link to the sample template to be used at login, so the user is presented with the fields on that template within the login screen. The sample record maintains a link back to the workflow node used to generate it. When the sample status changes, a database trigger on the server is run, and that looks up the associated workflow nodes. A search is then made for any event nodes directly below the sample node in the workflow, and if found, a further check is then made on the nodes in the workflow to see if the event corresponds to that occurring within the database. If the event matches one within the workflow, an entry is then made on the background queue, which contains enough information for a background process to perform the subsequent nodes within the workflow. A workflow can automate the complex processes within a laboratory through the use of decisions. The business process may state that every time a sample arrives from a particular client, an e-mail receipt should be generated and sent to that client. In a traditional LIMS, the services of an experienced analyst would be required to design and code a custom mechanism for this scenario. Decisions of this nature are common, and with the current invention are supported by the system "out of the box". Two types of decisions are supported—choices and selections. A choice permits the selection of one of two alternatives, whereas a selection permits a choice between more than two possible outcomes. FIGS. 4 and 5 show examples of the use of these nodes respectively. In the example shown in FIG. 4, the Test BARB_EL will only be assigned if the amount in the aliquot is sufficient, otherwise the HPLC_B test will be assigned. The selection node extends the If—Then—Else processing capability of the choice node—it permits multiple comparisons to be made, with a corresponding list of multiple outcomes. The example shown in FIG. 5 performs an action based on the conclusion of the aliquot. FIG. 6 shows an example of the display as seen by the user. Different windows may be selected using the tabs at the top of the screen. The user may select symbols from the drop-down lists at the right hand side of the screen and place them in the relevant position in the workflow in the left-hand window. Depending on the symbol selected (each symbol corresponding to a type of workflow node) a dialogue box may appear requesting further information from the user, or a selection screen permitting the user to select between options, as appropriate. Using the workflow model, decisions may be nested to any depth, and are extremely powerful as the data used for the decision may be retrieved from any dynamic node up the tree. Some database fields only occur on the aliquot, such as the amount of substance available within the aliquot. It is therefore possible to make decisions on splitting aliquots, such as "If I have more than 100 ml, split into two test tubes and send one to MicroBiology and store the other in a freezer. If less, omit the split and send the vial directly to MicroBiology".

Figure 7:
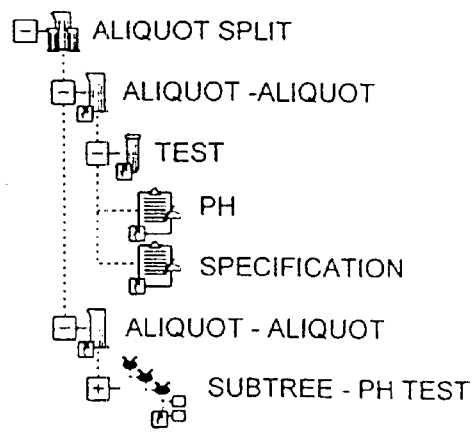
FIG. 7 shows an example of the use of a subtree.

Workflows may be combined, building a large and possibly very complex set of decisions and data definitions from predefined simpler workflows. A Subtree node is used to link one workflow to another. FIG. 7 shows an example, in which the workflow links to predefined aliquot and test workflows. Saving workflows in this manner permits complex workflows to be generated from reusable objects. The shortcut indicator (see FIG. 2) denotes a subtree. Aliquots are commonly split in the laboratory, so that vials of the same sample can be tested individually by different chemists. A Split node can be used within the workflow to automatically generate these subsequent aliquots, and the system maintains a link between any aliquot and its children, so that a hierarchy of aliquots can be generated. To support extensions to the system, a User Defined node is included, which when run calls user-supplied code. The user creates an object and the appropriate code is called by the system when the user object is encountered within the workflow. The User Choice node is similar to the User Defined node, but permits the user to supply code that can evaluate the choice. Again the appropriate (user-supplied) code will be called.

A Message Box node is used to display a message to the user, and would commonly be incorporated into a user event workflow. The text defined within the workflow is presented in the form of a dialogue box. Information may also be provided on various factors such as client factors, container factors, product factors and instrument factors. Factors are used to supply arguments to calculations, and look up numeric values stored in associated database tables. For instance, different clients may be charged according to different fee scales, this information being stored in a table as appropriate. Using workflow nodes, a user can select between various symbols, such as those shown in FIG. 2, to build up a workflow which is then actuated by the system. Instrumentation may be directly controlled by the workflow so that tests are performed automatically, or instructions may be made available co human operators to perform tests. Many other types of workflow node may be defined and made available as appropriate.

The manner in which the workflow nodes actually link to the databases, for example, will be familiar to those skilled in the art and will not be described in detail.

Furthermore, the nature of the database itself is no_critical to the operation of the invention in its various embodiments. By way of example, the Oracle ™ database system may be employed to store static and dynamic laboratory information. However, the static and dynamic data could equally be stored in Extensible Mark-up Language (XML). Many other systems, such as SQL/DS, may be equally suitable depending upon the specific tasks to be carried out.

What is claimed is:

1. A laboratory control system, comprising:

an electronic storage device, arranged to store an array of static laboratory data and an array of dynamic laboratory data;

a system data input/output for sending instructions to the laboratory, to generate dynamic laboratory data therefrom, and to receive dynamic laboratory data generated by the laboratory;

a graphical user interface providing an array of symbols each of which represents a task to be performed;

a user input arranged to permit a user to define a sequence of tasks by linking at least two of the array of symbols upon the graphical user interface; and a processor arranged to control the system, the processor being configured to execute, in turn, the associated task represented by the corresponding symbol selected by a user from amongst the array of symbols upon the graphical user interface by using data selected from at least some of the array of static laboratory data or at least some of the array of dynamic laboratory data derived from the laboratory.

2. The system of claim 1, in which the electronic storage device is arranged to store static laboratory data at least regarding the types of samples to be analysed and the types of tests to be performed.

3. The system of claim 1, in which the electronic storage device is arranged to store dynamic laboratory data at least regarding the identity of specific samples to be analysed and the results of analyses carried out thereon.

4. The system of claim 1, in which at least some of the array of symbols represent a single associated task to be executed by the processor.

5. The system of claim 1, in which at least some of the array of symbols represent a multiplicity of associated tasks to be executed by the processor.

6. The system of claim 1, in which at least one of the array of symbols represents an associated task to be executed by a device external to the system, the processor executing the associated task when selected by a user by using data obtained from the said device external to the system.

7. The system of claim 1, in which at least some of the array of symbols represent fixed, predefined tasks to be performed.

8. The system of claim 1, in which at least one of the array of symbols represents a task to be performed which task may be defined by a user.

9. The system claim 1, in which the graphical user interface is arranged to present the array of symbols in a first window, individual ones of the array of symbols being selectable for entry into a second window, the selected symbols being linkable within that second window.

10. The system of claim 9, in which the selected symbols within the said second window are linkable in a hierarchical tree structure such that a first selected symbol located at the root of the said tree structure and a second selected symbol located upon a branch of that tree structure causes the processor to execute a first associated task represented by the first selected symbol before execution of a second associated task represented by the second selected symbol.

11. The system of claim 10, in which the electronic storage device is further arranged to store a set of rules defining one or more sequences of tasks which are disallowed, the graphical user interface being in communication with the electronic storage device via the processor such that a user is prevented from linking symbols upon the graphical user interface so as to define a sequence of tasks which is defined by the set of rules to be disallowed.

12. A method of controlling data relating to, and obtained from, a laboratory comprising:
   (a) storing an array of static laboratory data;
   (b) receiving and storing an array of dynamic laboratory data at least some of which is updateable data generated by the laboratory;
   (c) providing an array of symbols upon a graphical user interface, each symbol representing a task to be performed;
   (d) defining a sequence of tasks by selecting and linking at least two symbols from amongst the array of symbols upon the graphical user interface; and
   (e) executing, in turn, the associated task represented by the corresponding symbol thus selected, by using data selected from at least some of the array of static laboratory data or at least some of the array of dynamic laboratory data received from the laborory.

13. The method of claim 12, in which the step (a) of storing an array of static laboratory data and an array of dynamic laboratory data includes the step of storing static laboratory data at least regarding the types of samples to be analysed and the types of tests to be performed.

14. The method of claim 12, in which the step (a) of storing an array of static laboratory data and an array of dynamic laboratory data includes the step of storing dynamic laboratory data at least regarding the identity of specific samples to be analysed and the results of analyses carried out thereon.

15. The method of claim 12, in which the static laboratory data are stored prior to the step (d) of executing the associated task.

16. The method of claim 12, in which the dynamic laboratory data are stored during the step (d) of executing the associated task in response to a prompt displayed by the graphical user interface.

17. The method of claim 12, in which at least some of the array of symbols represent a single associated task to be executed.

18. The method of claim 12, in which at least some of the array of symbols represent a multiplicity of associated tasks to be executed.

19. The method of claim 12, in which at least some of the array of symbols represent fixed, predefined tasks to be performed.

20. The method of claim 12, in which at least one of the array of symbols represents a task to be performed which task may be defined by a user.

21. The method of claim 12, further comprising:
   presenting the array of symbols in a first window upon the graphical user interface;
   selecting individual ones of the array of symbols for entry into a second window upon the graphical user interface; and
   linking the selected symbols within that second window.

22. The method of claim 21, further comprising:
   linking the selected symbols within that second window in a hierarchical tree structure, and executing a first associated task represented by a first selected symbol located at the root of the said tree structure before executing a second associated task represented by a second-selected symbol located upon a branch of that tree structure.

23. The method of claim 22, further comprising:
   storing a set of rules defining one or more sequences of tasks which are disallowed; and
   preventing linkage of symbols upon the graphical user interface when such linkage would result in a sequence of tasks which is defined by the set of rules to be disallowed.

24. A computer program product stored on a computer readable medium, the product being adapted for control of a computer comprising electronic storage means for storing an array of static laboratory data and an array of dynamic laboratory data, a graphical user interface providing an array of symbols each of which represents a task to be performed, and a processor in communication with the electronic storage means and the graphical user interface,
   the product comprising:
      computer readable program means for causing the processor to execute an associated task represented by the corresponding symbol selected by a user of the computer from amongst the array of symbols upon the graphical user interface;
      computer readable program means for causing the processor to carry out the said execution by using data selected from at least some of the array of static laboratory data and/or at least some of the array of dynamic laboratory data; and
      computer readable program means for linking at least two of the array of symbols upon the graphical user interface such that the processor is caused to execute each task represented by an individual one of the array of symbols selected by the said user from amongst the array of symbols in turn.

25. The method of claim 11, in which at least one of the tasks defined within the said sequence causes instructions to be sent to the laboratory which in turn result in the generation of the said updateable dynamic laboratory data.

* * * * *

UNITED STATES PATENT AND TRADEMARK OFFICE
CERTIFICATE OF CORRECTION

PATENT NO. : 6,594,588 B1                                                              Page 1 of 1
DATED      : July 15, 2003
INVENTOR(S) : Joseph Martin Peden et al.

It is certified that error appears in the above-identified patent and that said Letters Patent is hereby corrected as shown below:

Column 5,
Line 34, delete "co" and insert -- to --.

Column 6,
Line 29, delete "or" and insert -- and/or --.

Column 7,
Line 27, delete "or" and insert -- and/or --.
Line 28, delete "laborory" and insert -- laboratory --.

Signed and Sealed this

Ninth Day of December, 2003

JAMES E. ROGAN
*Director of the United States Patent and Trademark Office*